US012639369B2

(12) United States Patent
Zigler et al.

(10) Patent No.: US 12,639,369 B2
(45) Date of Patent: May 26, 2026

(54) DYNAMIC AUDIO FILE GENERATION

(71) Applicant: iHeartMedia Management Services, Inc., San Antonio, TX (US)

(72) Inventors: Jeffrey D. Zigler, Omaha, NE (US); Richard D. Wooden, Ogallala, NE (US); Jacqueline J. Lockhart, Poway, CA (US); Kevin R. Lockhart, Ogallala, NE (US); Theodore N. Myers, Fort Collins, CO (US); Evan A. Hill, Bend, OR (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 1290 days.

(21) Appl. No.: 16/678,984

(22) Filed: Nov. 8, 2019

(65) Prior Publication Data

US 2020/0073886 A1 Mar. 5, 2020

Related U.S. Application Data

(63) Continuation of application No. 14/109,272, filed on Dec. 17, 2013, now abandoned, which is a
(Continued)

(51) Int. Cl.
G06F 16/68 (2019.01)
G06F 16/638 (2019.01)
G06F 16/64 (2019.01)

(52) U.S. Cl.
CPC .......... *G06F 16/686* (2019.01); *G06F 16/639* (2019.01); *G06F 16/64* (2019.01); *G06F 16/68* (2019.01)

(58) Field of Classification Search
CPC ...... G06F 16/686; G06F 16/235; G06F 16/61; G06F 16/64; G06F 16/68; G06F 16/639
See application file for complete search history.

(56) References Cited

U.S. PATENT DOCUMENTS 6,317,880 B1 * 11/2001 Chamberlain ........... G06F 8/65
707/999.203
6,662,231 B1 12/2003 Drosset et al.
(Continued)

FOREIGN PATENT DOCUMENTS

WO 03065219 A1 8/2003

OTHER PUBLICATIONS

Http:/fen.wikipedia.org/wiki/Computer_file; Computer File; web page accessed Sep. 24, 2007 (6 pages).
(Continued)

*Primary Examiner* — Amanda L Willis
(74) *Attorney, Agent, or Firm* — Edward J. Marshall

(57) ABSTRACT

A method for time-sensitive data files in continuously generated data streams by a server computer comprises receiving user profile information associated with a plurality of different users and generating a dynamic data file that includes a plurality of user-selected metadata attributes, including a source link address to link with content via a universal resource locator file path. The method continues with the server computer receiving a request for a continuous data stream, generating the continuous data stream, inserting the dynamic data file in the continuous data stream and transmitting different content to a computing device associated with each of the plurality of different users.

18 Claims, 15 Drawing Sheets

Related U.S. Application Data continuation of application No. 12/239,473, filed on Sep. 26, 2008, now abandoned.

(60) Provisional application No. 61/013,825, filed on Dec. 14, 2007.

(56) References Cited

U.S. PATENT DOCUMENTS

| | | | |
|---|---|---|---|
| 6,721,741 B1 * | 4/2004 | Eyal .................... | G06F 16/9538 |
| | | | 707/999.102 |
| 2002/0099798 A1 | 7/2002 | Fedorovsky et al. | |
| 2002/0124263 A1 * | 9/2002 | Yokomizo .............. | H04H 60/33 |
| | | | 709/219 |
| 2003/0135608 A1 | 7/2003 | Bodin et al. | |
| 2004/0148424 A1 | 7/2004 | Berkson et al. | |
| 2006/0036488 A1 | 2/2006 | Golan et al. | |
| 2007/0005717 A1 | 1/2007 | LeVasseur et al. | |
| 2007/0043766 A1 | 2/2007 | Nicholas et al. | |
| 2007/0079326 A1 | 4/2007 | Datta et al. | |
| 2007/0094304 A1 | 4/2007 | Horner et al. | |
| 2007/0255965 A1 | 11/2007 | McGucken | |
| 2007/0276928 A1 | 11/2007 | Rhoads et al. | |
| 2008/0141328 A1 | 6/2008 | Weintraub et al. | |

OTHER PUBLICATIONS

International Searching Authority; International Search Report and Written Opinion; International Application No. PCT/US0877953; Dec. 16, 2008; 7 pgs.

RSS Advisory Board; RSS 2.0 Specification; Jun. 5, 2007 {7 pages).

Www.id3.org; What is ID3v2; web page accessed Sep. 24, 2007 {16 pages).

* cited by examiner

*Playlist*    6

| | |
|---|---|
| 21 | song |
| 22 | song |
| 23 | dynamic audio file (e.g., news) |
| 24 | song |
| 25 | song |
| 26 | song |
| 27 | song |
| 28 | dynamic audio file (e.g., weather) |
| 29 | song |
| 30 | song |

*FIG. 2*

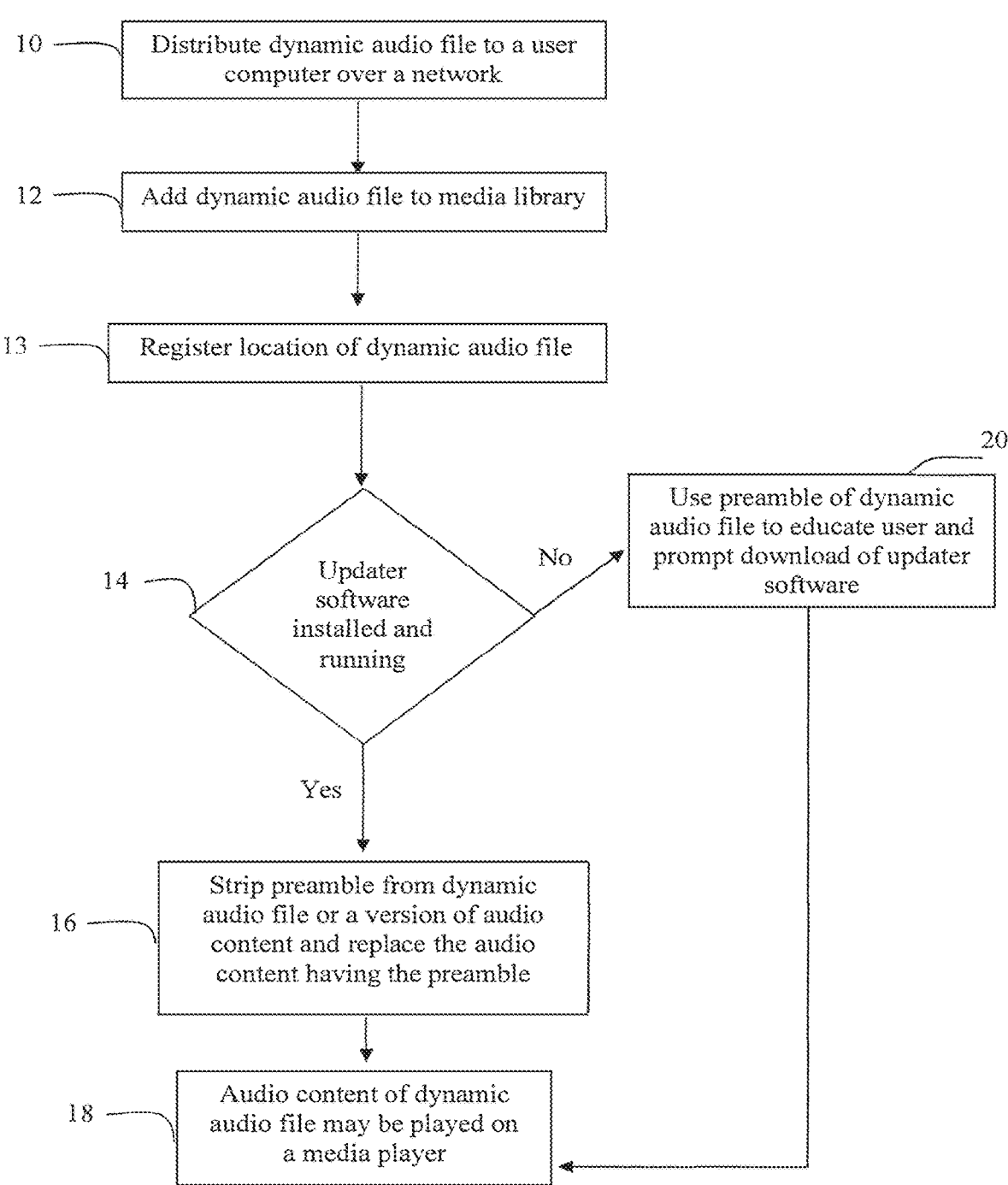

10 — Distribute dynamic audio file to a user computer over a network

12 — Add dynamic audio file to media library

13 — Register location of dynamic audio file

14 — Updater software installed and running

No → 20 Use preamble of dynamic audio file to educate user and prompt download of updater software Yes ↓

16 — Strip preamble from dynamic audio file or a version of audio content and replace the audio content having the preamble 18 — Audio content of dynamic audio file may be played on a media player

*FIG. 3*

| Name | Preferred | Datatype | Detail |
|---|---|---|---|
| FileVersionNumber | Yes | Variable Character | A file version number may be internal to the system. This attribute may be used by the updater software to differentiate between different dynamic audio file versions. |
| UniqueIdentifier | No | Variable Character | The unique identifier of the file. This identifier may be globally unique. It may be an index into a database. In some embodiments, it may also be the watermark identification. |
| GMToffset | Yes | Whole | Positive or negative offset in hours from GMT for date values. This attribute may be used to calibrate the DateTimePublished and DateTimeExpires values to the time zone of the updater installer. This attribute may be useful for files retrieved from different time zones. |
| DateTimePublished | Yes | DateTime | A date when the current version of the file was created. |
| DateTimeExpires | Yes | DateTime | A date when the current version of the file expires and the audio content should be replaced with updated content from the primary source link specified in the SourceURL. |
| ExpiresResolution | No | Integer | The maximum number of seconds by which it is permissible for the updater software to shift an update request. This may be used by the updater software which will generate a random number within this range so that all of the requests for updates may be spread out over a period of time to avoid instantaneous server load. |
| SourceURL | Yes | Variable Character | This may be a fully formed URL file path comprising a primary source link. In some embodiments, it may be publicly available on the internet. |
| BackupSourceURL | No | Variable Character | This may be a fully formed URL file path comprising an alternative source link. |
| AlertURL | No | Variable Character | This may be a fully formed URL file path comprising a redirection source link. |
| ContentType | No | Variable Character | May describe the type of audio content, such as News, Weather, Traffic, Sports, Music, Talk, EmergencyAlert. |
| Publisher | Yes | Variable Character | This may refer to a radio station or other source that is distributing, creating and updating the file. |
| Title | Yes | Variable Character | This may specify the title of the audio content or the type of dynamic audio file. |
| ContentStartTime | No | Int | Number of seconds into the audio portion of the file that the content starts. Audio content prior to the start time may be considered a preamble that may be ignored, skipped over or stripped out by the updater software. |
| SetMember | No | Bit | This indicates whether or not a part of a set. |
| SetPosition | No | Int | If a set member, the location of this dynamic audio file in the set. |
| SetURLList | No | Variable Character | A delimited list of URLs in order for the entire set, including the current file. The delimiting character may be URL safe and may be a character or combination of characters never found in a URL. |

FIG. 12

| Dynamic Audio File Attribute | ID3v2 Frame | Detail |
|---|---|---|
| | File Type | File Type = MP3 / dynamic audio file. This is the ID3v2 frame that the updater software may refer to in order to determine whether to treat the MP3 as a dynamic audio file. |
| FileVersionNumber | n/a | This attribute may not have a semantic match within the ID3v2 standard and may not be placed in any of the standard ID3v2 fields. |
| UniqueIdentifier | Unique MP3 Identifier | Semantic meaning as described in Table 1. Behavior may vary widely across different platforms that implement ID3v2 support. |
| GMToffset | n/a | This attribute may not have a semantic match within the ID3v2 standard and may not be placed in any of the standard ID3v2 fields. |
| DateTimePublished | Date of Recording, Time of Recording | Semantic meaning as described in Table 1. Behavior may vary widely across different platforms that implement ID3v2 support. |
| DateTimeExpires | n/a | This attribute may not have a semantic match within the ID3v2 standard and may not be placed in any of the standard ID3v2 fields. |
| SourceURL | Primary Source Link | Semantic meaning as described in Table 1. Behavior may vary widely across different platforms that implement ID3v2 support. |
| BackupSourceURL | User Defined URL Link Frame | Semantic meaning as described in Table 1. Behavior may vary widely across different platforms that implement ID3v2 support. |
| AlertURL | n/a | This attribute may not have a semantic match within the ID3v2 standard and may not be placed in any of the standard ID3v2 fields. |
| ContentType | Content Type | Semantic meaning as described in Table 1. Behavior may vary widely across different platforms that implement ID3v2 support. |
| Publisher | Publisher | Semantic meaning as described in Table 1. Behavior may vary widely across different platforms that implement ID3v2 support. |
| Title | Title | Semantic meaning as described in Table 1. Behavior may vary widely across different platforms that implement ID3v2 support. |
| ContentStartTime | ID3v2 Chapter Frame Addendum | Semantic meaning as described in Table 1. Behavior may vary widely across different platforms that implement ID3v2 support. |
| SetMember | Part of a Set | Semantic meaning as described in Table 1. Behavior may vary widely across different platforms that implement ID3v2 support. |
| SetPosition | Track Number / Position in Set | Semantic meaning as described in Table 1. Behavior may vary widely across different platforms that implement ID3v2 support. |
| SetURLList | n/a | This attribute may not have a semantic match within the ID3v2 standard and may not be placed in any of the standard ID3v2 fields. |

FIG. 13

| Attribute | Category | Destination | Detail |
|---|---|---|---|
| FileVersionNumber | Dynamic Audio File Attribute | ID3v2 Header | This may be used as the value to place into the dynamic audio file header when it is created. |
| UniqueIdentifier | Dynamic Audio File Attribute | ID3v2 Header | This may be used as the value to place into the dynamic audio file header when it is created. |
| GMToffset | Dynamic Audio File Attribute | ID3v2 Header | May be exposed in the user interface and may read from system. |
| DateTimePublished | Dynamic Audio File Attribute | ID3v2 Header | This may be used as the value to place into the dynamic audio file header when it is created. |
| DateTimeExpires | Dynamic Audio File Attribute | ID3v2 Header | Exposed in user interface as "add X hours" or "add X days." |
| ExpiresResolution | Dynamic Audio File Attribute | ID3v2 Header | |
| SourceURL | Dynamic Audio File Attribute | ID3v2 Header | This may be a directory value. The filename may be appended to this based on the logic discussed in "Output File." |
| BackupSourceURL | Dynamic Audio File Attribute | ID3v2 Header | This may be a directory value. The filename may be appended to this based on the logic discussed in "Output File." |
| AlertURL | Dynamic Audio File Attribute | ID3v2 Header | |
| ContentType | Dynamic Audio File Attribute | ID3v2 Header | May be bound in the user interface as the type of audio content such as News, Weather, Traffic, Sports, Music, Talk, or EmergencyAlert. |
| Publisher | Dynamic Audio File Attribute | ID3v2 Header | |
| Title | Dynamic Audio File Attribute | ID3v2 Header | |
| ContentStartTime | Dynamic Audio File Attribute | ID3v2 Header | Not in assembly XML file or user interface. This may be programmatically determined based on the length of the preamble. |
| SetMember | Dynamic Audio File Attribute | ID3v2 Header | |
| SetPosition | Dynamic Audio File Attribute | ID3v2 Header | Greyed out in the user interface unless SetMember is checked. |
| SetURLList | Dynamic Audio File Attribute | ID3v2 Header | Greyed out in the user interface unless SetMember is checked. |
| Internet Radio Station Name | ID3v2 attribute | ID3v2 Header | |
| Internet Radio Station Owner | ID3v2 attribute | ID3v2 Header | |
| Copyright Message | ID3v2 attribute | ID3v2 Header | |
| Official Internet Radio Station Home Page | ID3v2 attribute | ID3v2 Header | |
| Official Audio File Webpage | ID3v2 attribute | ID3v2 Header | This field may include a link to the updater installer. |
| Content Location | File Path | Audio content | This may be the audio content in ".wav" or ".mp3" format. |
| PreRoll Location | File Path | Audio content | This audio file comprising the preamble may be prepended to the audio content (.wav or .mp3). |
| Output Directory | File Path | n/a | This may be the local file path where the resultant file may be output. |
| Output File | File Path | n/a | If this is left null, the output file may have the same name as the Content Location file name (.mp3 only). |

FIG. 14

| Attribute | Exposed in User Interface | Exposed in Configuration File | Detail |
|---|---|---|---|
| FileVersionNumber | | Yes | Defaults to 1. |
| UniqueIdentifier | Yes | | |
| GMToffset | | | Reads from system. |
| DateTimePublished | | | Reads from system. |
| DateTimeExpires.Datepart | Yes | Yes | Hours or days. |
| DateTimeExpires.Count | Yes | Yes | Up to 99. |
| ExpiresResolution | Yes | Yes | |
| SourceURL | | Yes | This may be a directory value. The filename may be appended to this based on the logic discussed in "Output File." |
| BackupSourceURL | | Yes | This may be a directory value. The filename may be appended to this based on the logic discussed in "Output File." |
| AlertURL | | Yes | |
| ContentType | Yes | Yes | Bound in the user interface as the type of audio content such as News, Weather, Traffic, Sports, Music, Talk, or EmergencyAlert. |
| Publisher | | Yes | |
| Title | Yes | | |
| SetMember | Yes | Yes | |
| SetPosition | Yes | | May be greyed out in the user interface unless SetMember is checked. |
| SetURLList | Yes | Yes | May be greyed out in the user interface unless SetMember is checked. |
| Internet Radio Station Name | Yes | Yes | |
| Internet Radio Station Owner | | Yes | |
| Copyright Message | | Yes | |
| Official Internet Radio Station Home Page | Yes | Yes | |
| Official Audio File Webpage | | Yes | This field may include a link to the updater installer. |
| Content Location | Yes | | This may be the audio content in ".wav" or ".mp3" file format. |
| PreRoll Location | Yes | Yes | This may be the audio content in ".wav" or ".mp3" file format. |
| Output Directory | Yes | Yes | This may be the local file path where the resultant file may be output. |
| Output File | Yes | | |

FIG. 15

DYNAMIC AUDIO FILE GENERATION

CROSS-REFERENCE TO RELATED APPLICATIONS

The present U.S. Utility Patent Application claims priority pursuant to 35 U. S.C. § 120, as a continuation, to U.S. Utility application Ser. No. 14/109,272, entitled, "Dynamic Audio File Generation", filed Dec. 17, 2013, pending, which in turn claims priority pursuant to 35 U.S.C. § 120, as a continuation, to U.S. Utility application Ser. No. 12/239, 473, now abandoned, entitled, "Dynamic Audio File and Method of Use", filed Sep. 26, 2008, which claims priority pursuant to 35 U.S.C. § 119(e) to U.S. Provisional Application No. 61/013,825, entitled, "Dynamic Audio File and Method of Use", filed Dec. 14, 2007, all of which are hereby incorporated herein by reference in their entirety and made part of the present U.S. Utility Patent Application for all purposes.

COPYRIGHT NOTICE

This application contains material that is subject to copyright protection. Such material may be reproduced by any person exactly as it appears in the Patent and Trademark Office patent files or records. The copyright owner otherwise reserves all rights to such material.

BACKGROUND

From a media user's point of view, media files are "static." In other words, the content of a media file does not change. In the context of a media playlist of country and western music, for example, a media file of George Strait's "Ace in the Hole" contains only that song when played on a media player. A user cannot update the content of that file with new content and still keep that file's place in the playlist. To add new content, a user must create a new file or playlist entry for that content. Thus, there exists a need for a system and method for updating media content within a playlist.

SUMMARY

Accordingly, a method of creating a dynamic audio file may comprise associating a tag with an audio file having audio content and the tag may comprise a location file path of a source of the audio content. A method of updating a dynamic audio file may comprise sending a dynamic audio file, receiving a request for updated audio content, and sending the updated audio content in response to the request. In various embodiments, the dynamic audio file may comprise a tag and initial audio content and the tag may comprise a location file path of the audio content.

BRIEF DESCRIPTION OF THE FIGURES

FIG. 2 illustrates an embodiment of a playlist incorporating dynamic audio files.

FIG. 3 is a flowchart of a method for using a dynamic audio file in accordance with an embodiment of the present invention.

Table 1 is a listing of metadata attributes associated with an embodiment of a dynamic audio file.

FIG. 12 is a table (Table 1) listing metadata attributes associated with an embodiment of a dynamic audio file.

FIG. 13 is a table (Table 2) demonstrating how metadata attributes map to ID3v2 frames in an embodiment of a dynamic audio file.

FIG. 14 is a table (Table 3) providing a listing of attributes of an embodiment of an assembly XML file that may be used to create a dynamic audio file.

FIG. 15 is a table (Table 4) showing an implementation matrix for a graphical user interface in connection with an embodiment of assembly software.

DETAILED DESCRIPTION

Figure 1:
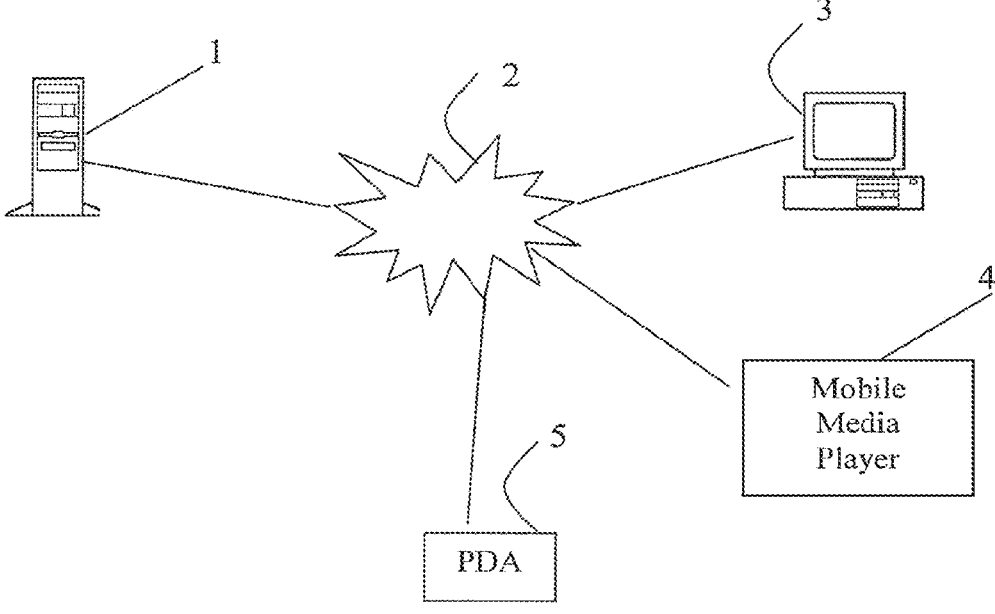
FIG. 1 illustrates an embodiment of a system that may be used for transferring and using dynamic audio files.

FIG. 1 illustrates one embodiment of a system and method for updating media content. In this embodiment, a radio broadcaster may manage a plurality of radio stations, and may accordingly host web sites for one or more radio stations at a server 1. Those skilled in the art will recognize that each radio station may be assigned its own server. A user may communicate with server 1 from, for example, a computer 3 through a network 2, such as the Internet. Alternatively, a user may communicate with a server 1 from, for example, a mobile media device 4 or PDA 5. Those having skill in the art will recognize that a user may communicate with the server 1 using any suitable device, such as a cellular phone, a hand-held computer, an iPod, Sony Walkman, Creative Zen media player or other portable media player, or any other general purpose computer, PC, microprocessor, computer server, digital signal processor, mobile phone, or a combination thereof. In one disclosed embodiment, the user may communicate with a computer 3.

The user may have stored a library of media files on her computer 3 in a format suitable for playback on a media player. In this embodiment, the media player may be an application installed on the computer 3. For example, the user may have stored a library of songs in MP3 format for playback on a Windows Media Player application installed on the computer 3. Those skilled in the art will recognize that various other media players may be supported, such as iTunes, RealPlayer, WinAmp and the like, and that the media players may be web-based or otherwise provided to the user for playback of locally-stored content, or a mix of locally-stored and remotely-provided content, or remotely provided content. The user may have further arranged some of those media files into a playlist. In one embodiment, the media files may comprise songs arranged so as to provide a particular listening experience. Those skilled in the art will also recognize that a user may maintain a library of media files on a computer, and manage that library using a suitable media player application which also allows media file management, such as Apple's iTunes software. Those skilled in the art will further recognize that a user may use that media management/media player application to create a playlist that may be played using the media management/media player application, or transferred to mobile media player, such as Apple's iPod media player, for playback. Those skilled in the art will recognize that the updater software disclosed herein may be provided as part of a media management or media player application, or may incorporate features of media management and media player applications.

The user may desire listen to more than an unbroken series of songs or similar audio elements. Thus, a dynamic audio file may be included in the user's playlist to allow the user to listen to perishable, or relatively time-sensitive, content or other types of content. Examples of perishable content include daily news, sports scores, DJ chatter, traffic reports, emergency information, public service announcements (PSAs), talk show programs, personal messages and weather reports. A dynamic audio file may also be included in the user's playlist to provide new songs, e.g., updatable incorporation of Top-10 songs into the playlist, or other content, such as advertisements and station jingles. By including one or more dynamic audio files, a playlist may provide, for example, a more radio-like listening experience. Accordingly, the user may download from server 1 a dynamic audio file and include the dynamic audio file in the playlist. The user may also download updater software provided to allow the user to set dynamic audio file preferences. Those having skill in the art will recognize that the user may obtain a dynamic audio file and updater software in other ways, such as on CD or by RSS feed.

FIG. 2 illustrates an embodiment of a playlist 6 that includes two dynamic audio files 23 and 28. In the embodiment of FIG. 2, the playlist 6 includes ten media files that the user has selected to create a particular listening experience. Songs occupy playlist 6 slots 21, 22, 24, 25, 26, 27, 29 and 30, and dynamic audio files occupy slots 23 and 28. Those having skill in the art will recognize that the time duration of each slot may vary depending on the media file occupying each slot. However, the overall playlist may have been arranged to provide a listening experience of a certain length of time. Accordingly, as discussed in more detail herein, content provided by the dynamic audio file, as may be updated from time to time, may be adjusted to substantially maintain that length of time.

In this embodiment, the user has elected to include in the listening experience a news report from radio station WOAI in San Antonio, Tex. The user may thus download a dynamic audio file from the WOAI radio station server, and include it at two locations in her playlist 6. As may be seen in the playlist 6 of FIG. 2, the user has chosen to listen to the WOAI news report at slot 23 between songs in slots 22 and 24, and at slot 28 between songs in slots 27 and 29. By including a dynamic audio file at slots 23 and 28 of the playlist 6, the user may receive the most up-to-date news from WOAI when those dynamic audio files are played, whenever that may be, and may receive the updated news without having to re-construct the playlist 6 to include updated content. Those skilled in the art will recognize that the dynamic audio files in slots 23 and 28 may provide sports scores, weather updates, traffic reports, and other perishable content, as well as fresh songs, or some mix of those elements. Furthermore, the dynamic audio file in slot 23 may provide different content than the dynamic audio file in slot 28. For example, the dynamic audio file in slot 23 may provide news, and the dynamic audio file in slot 28 may provide updated news, or sports, or an advertisement. Those skilled in the art will further recognize that a playlist may contain one or more dynamic audio files, and may be comprised entirely of dynamic audio files. A dynamic audio file may therefore allow a user's media library or playlist content to be automatically updated without the need for a user to download new content and add the new content to the media player's library or playlist.

The audio content associated with a dynamic audio file may be replaced with updated audio content. As such, a radio broadcaster may distribute updated audio content which will be associated with one or more dynamic audio files that already reside on a user's computer. A dynamic audio file may serve as a content placeholder so that when updated content is distributed, the location of the updated content in the playlist will be the same as the location of the replaced content. In other words, a single library or playlist element reference may be provided for each dynamic audio file and all subsequent updates to each file.

Those skilled in the art will recognize that dynamic audio files may be of any suitable format, such as .acc, .wmp, .wma, .wav, .ogg, .ra, .m4a, and .mp3, to name a few examples. Those skilled in the art will also recognize that a dynamic audio file may have "default" or initial content. For example, a user may download a dynamic audio file that already includes the latest news reports from a particular radio station and is further configured to include updated news reports when those updates are accessed. Those skilled in the art will recognize that a user may, after downloading, change her preferences with respect to that dynamic audio file.

A dynamic audio file may be moved, played, or otherwise manipulated in a manner similar to known audio files, in addition to other capabilities described herein. From a user's perspective, a dynamic audio file may not appear to be any different from a traditional audio file. For example, a dynamic audio file may be named "WOAI News" file while the artist name may be provided as "WOAI." A user may browse through their media library using their media player's available searching tools to find the "WOAI News" file and play the audio content in the "WOAI News" file on demand or put the "WOAI News" file in a playlist with other audio files. As described above, a user may, for example, play the same "WOAI News" dynamic audio file incorporated into her playlist again and again, yet hear more current content within that playlist 6 as made available for updating. A user may also play dynamic audio files in a static mode, i.e., when the user's computer is not connected to a network or otherwise able to communicate with the content source. In such a circumstance, the dynamic audio file may contain the most-recently updated content. Thus, the exemplary "WOAI News" dynamic audio file retains its place in the user's media player library and playlist while providing updated content.

A media provider may thus make dynamic audio files and updater software available to users for downloading or other transfer. The updater software may be used by a user to automatically retrieve updated audio content from the broadcaster's website and replace the previous content with the updated content. Updated audio content may thus be automatically associated with the dynamic audio file. Updater software may comprise executable instructions installed on a user's computer (or other media device) to allow the user's computer to download new audio files from the broadcaster's computer. Updater software may give the broadcaster the ability to automatically update dynamic audio files and distribute audio content without the user having to affirmatively request such an update. Also, a dynamic audio file may contain update instructions that may be extracted by the updater software and stored at the user's computer. Updater software may periodically connect to the broadcaster's server to check for and receive updated audio content with which to replace audio content already associated with the user's dynamic audio files.

FIG. 3 illustrates an exemplary method for using a dynamic audio file. In this example, a dynamic audio file may be provided to a user's computer over a network, such as the Internet, by, for example, direct download or by an RSS feed, as indicated at 10. A dynamic audio file may be added to the user's media library as a static library asset, as indicated at 12. The location path of the dynamic audio file in the user's computer may further be registered with the updater software and/or at the broadcaster's server, as indicated at 13. In various embodiments, a manual pathing process may also be provided to allow a user to move a dynamic audio file to another location. Thereafter, the dynamic audio file may be played. The dynamic audio may be programmed to determine whether the user's computer has updater software installed and running the first time that the dynamic audio file is played as indicated at 14. Alternatively, the server may determine whether the user's computer has updater software installed and running. If updater software is not running or is not installed, a preamble at the beginning of the audio content in the dynamic audio file may be played to educate a user about dynamic audio files and prompt a user to download updater software, as indicated at 20. For example, a preamble may provide an audible statement: "You have downloaded a dynamic audio file having news content. Please download the updater software to receive updates." If updater software is installed and running, the preamble may be stripped from the audio content in the dynamic audio file, as indicated at 16. Alternatively, a version of the audio content without the preamble may be downloaded and may replace the audio content that had the preamble, as also indicated at 16. In yet another embodiment, a preamble may be played regardless of whether updater software is running and the preamble may provide other useful information that the broadcaster wishes to distribute. Once the dynamic audio file has been downloaded, the audio content of a dynamic audio file may then be played on a variety of media players, as indicated at 18. As noted above, if a user's computer is a desktop computer, a user may transfer the dynamic audio file to another media player, such as an iPod, MP3 player, or PDA. When a media playback device is connected to a network such that the media playback device may communicate with the appropriate server, the dynamic audio file may be updated.

In some embodiments, updater software may manage and control the update process without requiring any user interaction. As previously discussed, updater software may be downloaded onto a user's computer. Alternatively, updater software may reside on a broadcaster's computer and perform the audio content updating from the broadcaster's computer. The updater software may also interact with the user's computer to perform the update process described herein. Of course, updating audio content may also be initiated automatically when a user plays back, moves, changes settings for, or otherwise manipulates a dynamic audio file.

Figure 4:
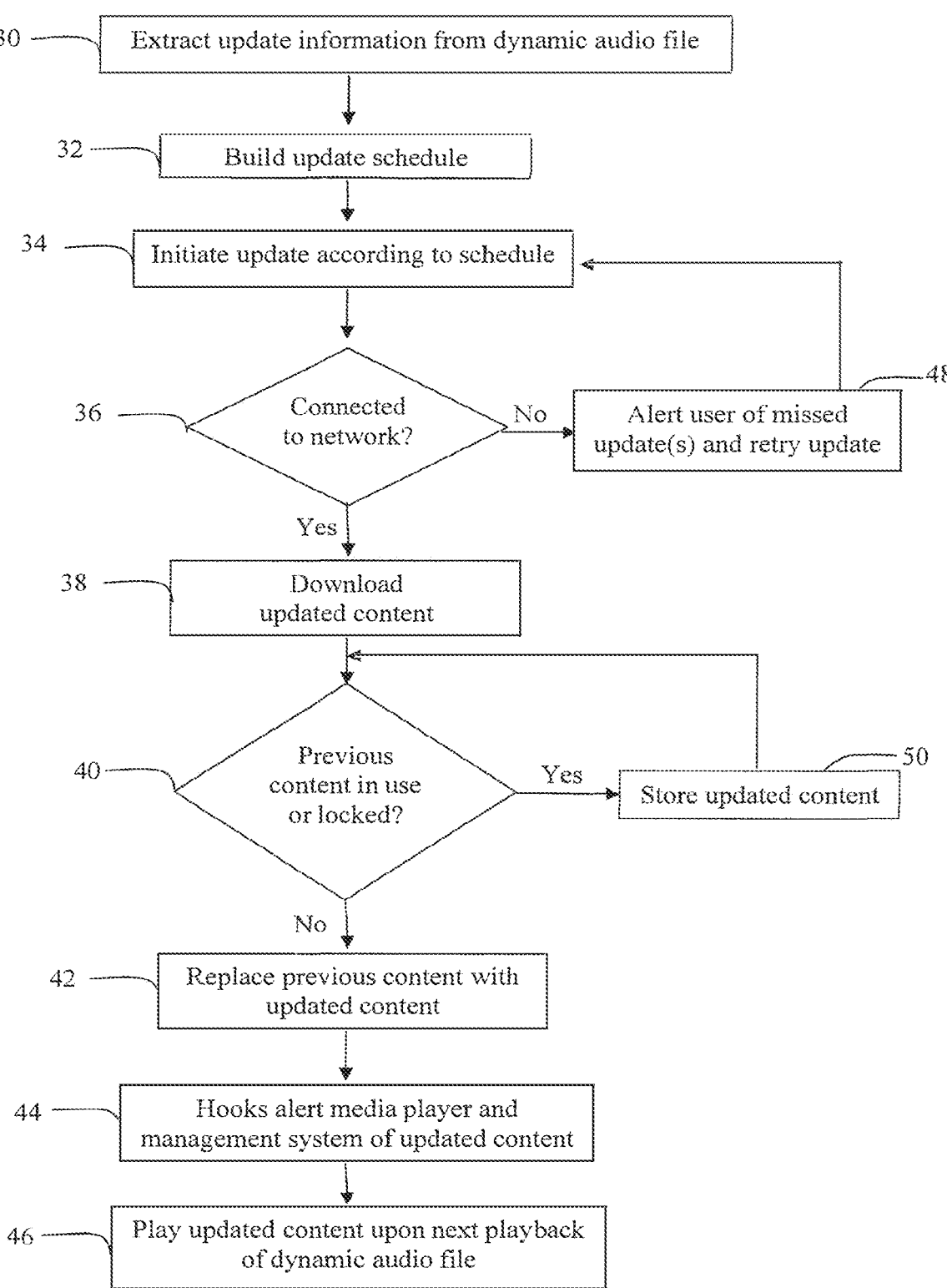
FIG. 4 is a flowchart of a method for updating the audio content of a dynamic audio file in accordance with an embodiment of the present invention.

Referring to FIG. 4, an exemplary method of updating the audio content of a dynamic audio file may include extracting update information from a dynamic audio file when the dynamic audio file is first downloaded onto a user's computer, as indicated at 30. Accordingly, incoming dynamic audio files may be automatically registered with updater software during downloading so the user does not have to specify to the updater software a location for updates. Alternatively, updater software may retrieve location and update information from a dynamic audio file after the file is downloaded. Update information distributed with dynamic audio files may include a link (or links) to a content source (or sources) providing the updates. Such content source links ensure proper replacement of previous content with updated content. A plurality of content source links may be provided, including but not limited to a primary source link specifying the default location of updated content, an alternative source link for when the primary source link is not available, and a redirection source link. A redirection source link may, for example, be utilized in emergency situations, such that a broadcaster may automatically distribute audio content having emergency instructions, for instance informing users to seek cover due to bad weather conditions. Update information extracted by updater software may also include positive time metadata for scheduling updates and fail-over linking. In various embodiments, usage keys and digital signature systems may be incorporated in the update information in order to guard against misuse of the updater software by unauthorized third parties.

Referring still to the exemplary method of FIG. 4, an update schedule may be built for a particular dynamic audio file from update instructions extracted from the dynamic audio file, as indicated at 32. In some embodiments, updates may be initiated by updater software according to the update schedule, as indicated at 34. The updater software may determine if the user's computer is connected to a network, as indicated at 36. If a user's computer is connected to a network, updated audio content may be downloaded over the network from a content server using one of the content source links, as indicated at 38. If a user's computer is not connected to a network, a user may be alerted of missed updates as indicated at 48. If a network connection is not present, the updater software may make one or more later attempts to update and check again for a connection. If a network connection is present, updated audio content may then be downloaded, as indicated at 38.

Once updated content has been downloaded, the updater software may determine whether the dynamic audio file to be updated is in use or locked, as indicated at 40. If not, the updater software may replace the previous content in a dynamic audio file with updated content by associating updated content with the dynamic audio file, as indicated at 42. That may be accomplished, for example, by deleting the old audio content, renaming the updated audio content with the name of the old audio content, and placing the renamed updated audio content in the location file path of the old audio content. If the dynamic audio file to be updated is in use or if there is a file lock on the file when an update is downloaded, the updated content may be held in local memory (or, in other embodiments, discarded and downloaded again later) and previous content in a dynamic audio file may continue to play or be used, as indicated at 50. When the previous content is no longer in use, or the file lock is relinquished, updated content may replace previous content and be associated with the dynamic audio file, as indicated at 42. As indicated at 44, programming hooks in the updater software may alert a media player and library management system of updated content such that identifying information of the updated content may be incorporated. For instance, if the updated content has a different duration or title than the previous content, the new duration or title may be noted accordingly by the media player and library management application as a result of such programming hooks. In other embodiments, programming hooks may not be necessary if the user's media player or library management system automatically detect updates to content. As shown at 46, after previous content is updated, the updated content may be played upon the next playback of the respective audio file.

In various embodiments, updates to the audio content of a dynamic audio file may be determined by various settings, specified either by a user or by a radio broadcaster. For example and not by way of limitation, in some embodiments a user may provide settings as to various types of music, news, or radio talk shows that the user would prefer to be downloaded. These settings may be part of a playlist processing module provided as part of the updater software. Alternatively, playlist processing as described herein may be provided separate from the updater software. A playlist processing module may process an offline playlist for timing analysis and content insertion, or analyze an online playlist and add audio content as needed based on user settings. A playlist may comprise a time-based or other arrangement of audio content, such as a listing of songs to be played in a specified order. For example, a user may specify that music should be updated every week, news should be updated every day, and radio talk should be updated every hour. Alternatively, a user may request that a certain percentage of various types of music be played each hour, such as 50% Jazz and 50% Rock. In this example, 50% of the dynamic audio files downloaded may be "JAZZ" dynamic audio files, and the other 50% may be "ROCK" dynamic audio files. The playlist processing module may analyze the playlist and request updates to fulfill these settings. In addition, a user may create a playlist having static audio files and specify that news be played on a certain time interval, for instance every 60 minutes during the time that the playlist having traditional audio files is being played. When the user is playing the playlist, the playlist processing module may analyze the playlist and estimate where to insert and update dynamic audio files, e.g., those having news content.

The playlist processing module may analyze the playlist in real-time and obtain updated perishable content, e.g., news, based on the time that passed since perishable content was last played. A user may elect to receive audio content from a plurality of different content sources, e.g., radio stations. For instance, if a user prefers the music from station A, the news from station B, and the traffic report from station C, a user may download one or more dynamic audio files having music content from station A, one or more dynamic audio files having news content from station B, and one or more dynamic audio files having traffic report content from station C. A user may then set how often music, news, and traffic reports should be updated, or how often those files should be should be played during a particular playlist. If each dynamic audio file has a different content source link, content may be updated from each of the three radio stations, A, B, and C, for the type of content selected by the user. Those skilled in the art will recognize that one or more servers may provide content for radio stations A, B and C. Alternatively, updater software may provide the ability for a user to update content on demand. A user may manually request an update, for instance if a user is following a particular breaking news story and wishes to manually control the timing of updates.

A radio broadcaster may also have control over the timing and manner of updates to dynamic audio files. For instance, a radio broadcaster may create and provide for downloading on their website a dynamic audio file for "Breaking Music" where the song may be changed every week, day, hour or minute. This embodiment may allow a radio broadcaster to generate and maintain listener interest because the listener has the ability to request that the newest music be distributed to them. Alternatively, a radio broadcaster may provide a series of dynamic audio files which, when downloaded, are automatically assembled into a playlist 6 that presents a musical sequence such as "Today's Top 10 Songs." Each day, the content of the dynamic audio files may be automatically replaced with that day's top ten songs. In addition, a radio broadcaster may distribute "Test Music" dynamic audio files in order to distribute test music to listeners to gauge their reactions and preferences. In another embodiment, a radio broadcaster may distribute advertisements based on user registration information that may be gathered by updater software. For instance, a user may be asked to enter a residence address, and other user information, before downloading the updater software or before receiving dynamic audio files. "Advertisement" dynamic audio files may be distributed and the redirection content source links may be utilized by the radio broadcaster to direct updates to the "advertisement" dynamic audio file based on user information, such as redirecting audio content to provide advertisements particular to the geographic area where the user resides. Of course, other information about the user may be used to determine where to retrieve updated content such as advertisements. In yet another embodiment, a radio broadcaster may distribute a plurality of dynamic audio files that may be used each day to distribute an entire radio broadcast for that day or for a day part. A radio broadcaster may update the audio content in a plurality of dynamic audio files several times throughout the day to create and distribute a traditional radio broadcast over a network. Those skilled in the art will recognize that "push" or "pull" technology could be used to effect those embodiments.

In various embodiments, the dynamic audio file format may contain a number of attributes. Of course, the following description is for exemplary purposes only and a dynamic audio file may have a variety of attributes. Metadata attributes may be associated with a dynamic audio file that may be retrieved through use of an audio watermark. Such an audio watermark may make the actual audio content format arbitrary.

In one embodiment, metadata attributes may be stored in an ID3 version 2 ("ID-3v2") file tag or header made part of an MP3 audio file. In this embodiment, an ID3v2 tag may be 256 MB in size, and contain a number of 16 MB frames. Those skilled in the art will recognize that ID3 tags may be of variable size, and contain a variety of frames. The ID3v2 tag is described here by way of example. An ID3v2 tag may also include without limitation text and encryption, as well as linked information and weblinks. Thus, the dynamic audio file may be, in this embodiment, an ID3v2-tagged mp3 file that is instantiated as described herein. A device or media player that does not have the updater software installed may recognize this embodiment of a dynamic audio file as an mp3 file that has some proprietary ID3v2 tags in a vendor-specific or private frame, and the ID3v2 tag will not prevent such recognition. Of course, dynamic audio files may be provided in other formats, such as those mentioned above, with the tags or headers pertaining to those formats.

Table 1 shows exemplary metadata attributes that may be associated with an mp3 file in an ID3v2 compliant mp3 header to create a dynamic audio file. Table 1 describes each attribute and how the attribute may be used. In Table 1, an attribute with "yes" in the "Preferred" column indicates that the attribute may be preferred for implementation of an embodiment of the updater software. In this embodiment, the optional attributes, indicated with a "No" in the "Preferred" column may be optional in the ID3v2 public standard, so the updater software may not consider their absence a failure condition. In some embodiments, each preferred attribute in Table 1 may be placed into a private frame value for robustness. In other embodiments, however, less than all of those attributes, or other suitable attributes may be used to create a dynamic audio file. For example, a dynamic audio file preamble having information about dynamic audio files may be skipped by using the "ContentStartTime" attribute so that the audio content immediately plays when the dynamic audio file is played. Various software applications may read from the attributes.

In some embodiments, various attributes that are shown in Table 2 may also be placed in other standard, non-overloaded ID3v2 fields, to trigger complementary behavior of media players in this embodiment that support the ID3v2 header standard. In Table 2, an "n/a" in the "ID3v2 Frame" column indicates that the attribute may not be relevant to the embodiment of Table 2. Such behavior may include, for example, graphically depicting the source of the audio content of the dynamic audio file, which may be desirable in other embodiments. Table 2 describes how various attributes listed in Table 1 may map to ID3v2 frame values. The updater software may examine the ID3v2 frames to determine whether to treat the mp3 as a dynamic audio file. In other embodiments, all of the attributes in Table 2 are placed in a private vendor area of the ID3v2 file header. In other embodiments, some of the file attributes may be placed in the standard public areas of the ID3v2 file header, if the meaning and use of the dynamic audio file attribute matches the meaning and intended use of that same attribute in the ID3v2 header.

Figure 5:
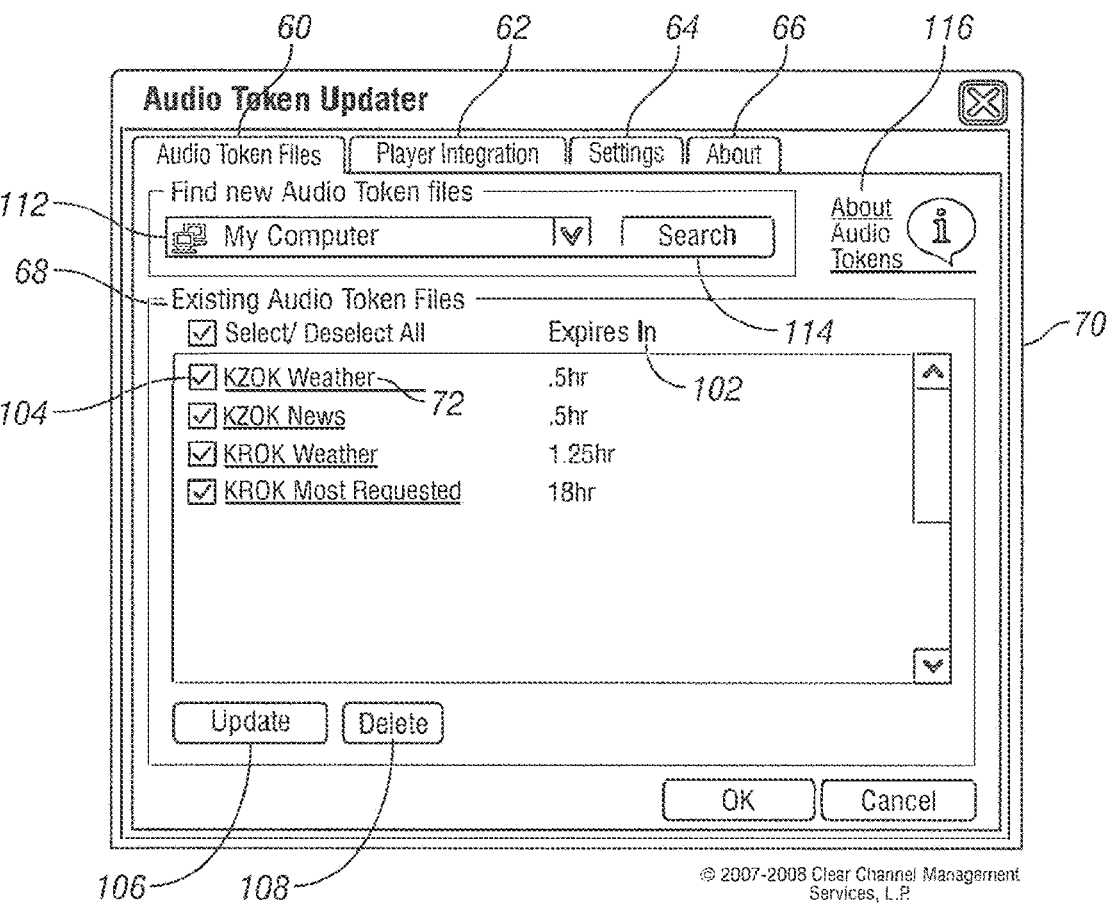
FIG. 5 illustrates an embodiment of a user interface that may be provided in connection with updater software.

In some embodiments, updater software may provide a user interface that may be launched when, for example, a user clicks on an updater software "tray" or on a start menu item. FIG. 5 depicts an embodiment of a user interface for the updater software. The user interface 70 may, in this example, include four interface areas accessible under tabs as shown in FIG. 5: an Audio Token Files tab 60, a Player Integration tab 62, a Settings tab 64, and an About tab 66. (Some figures herein may refer to dynamic audio files as "Audio Tokens" or "Audio Token Files.")

If a user clicks on the Audio Token Files tab 60, an Existing Audio Token Files section 68 of that tab may be provided that lists various dynamic audio files saved on the user's computer and registered with the updater software. A linked title may identify a dynamic audio file by name, for example "KZOK Weather" 72. A user may click on the linked title "KZOK Weather" 72 to launch a dynamic audio file detail window 80 as shown in FIG. 6.

Figure 6:
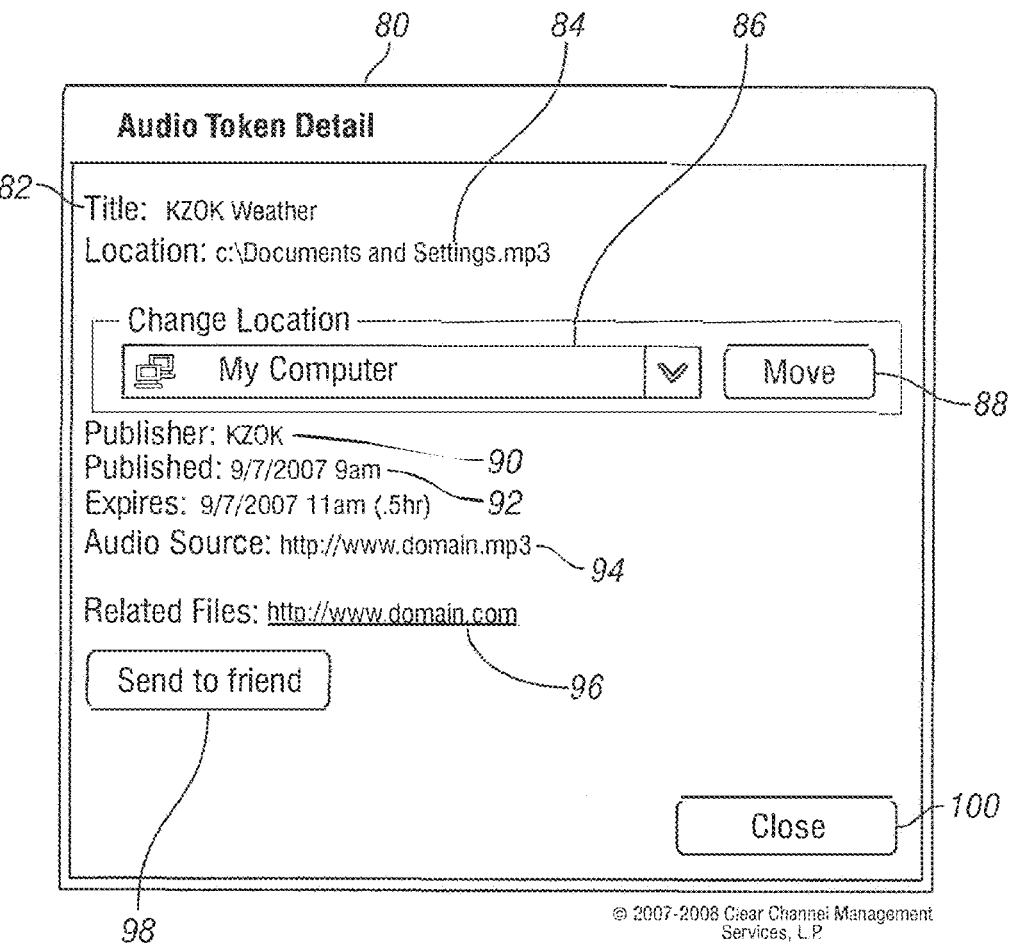
FIG. 6 illustrates an embodiment of a user interface that may be provided in connection with updater software showing the details of a dynamic audio file.

Turning to FIG. 6, the detail window 80 may provide the title 82 of the dynamic audio file ("KZOK Weather" in this example), the location path 84 of the dynamic audio file on a user's computer, a drop down menu 86 displaying directories or other remote or local locations to which a user may move the dynamic audio file by clicking on the move button 88, the publisher 90, e.g., radio station KZOK, of the dynamic audio file, the date and time 92 when the dynamic audio file was published, the content server source 94 of the dynamic audio file, and a Uniform Resource Locator ("URL") (or Uniform Resource Identifier "URI") 96 that, when selected, may link the user to the publisher's website. In addition, a Send to a Friend button 98 may be selected to transmit the dynamic audio file to a friend via email or some other form of electronic communication. For example, a "mailto:" command with configuration file values "SendtoFriendSubject" or "SendtoFriendText" may be used. If a Close button 100 is selected, the detail window 80 may close, while the user interface 70 in FIG. 5 may remain open.

Referring back to FIG. 5, section 68 may also display the amount of time until the dynamic audio file expires, until the content becomes stale, or until the next update, as the case may be, in Expires In column 102. A checkbox 104 next to a title of a dynamic audio file may be selected, at which point a check mark may appear. A user may use the checkboxes 104 to select a one or more dynamic audio files for updating, and then click on the Update button 106 to prompt the updater software to retrieve updated content for the selected dynamic audio files from their respective content sources. In some embodiments, clicking on the Update button 106 may also update the user's media player with new identifying information regarding the updated content, such as duration and song title, if applicable. Also, by selecting one or more dynamic audio files using a checkbox 104 corresponding to a selected dynamic audio file, a user may delete dynamic audio files by clicking on a Delete button 108.

Additionally, dynamic audio files on a user's computer that are not registered with the updater software may be found using drop down menu 112 to select a directory or location to search for new dynamic audio files. A user may also click on a Search button 114 to search a directory or location selected via drop down menu 112. Clicking on the Search button 114 may open up a new user interface for searching computer memory or remote databases. If unregistered dynamic audio files are found, the updater software may register those dynamic audio files and add those files to the list of registered dynamic audio files displayed in section 68.

Figure 7:
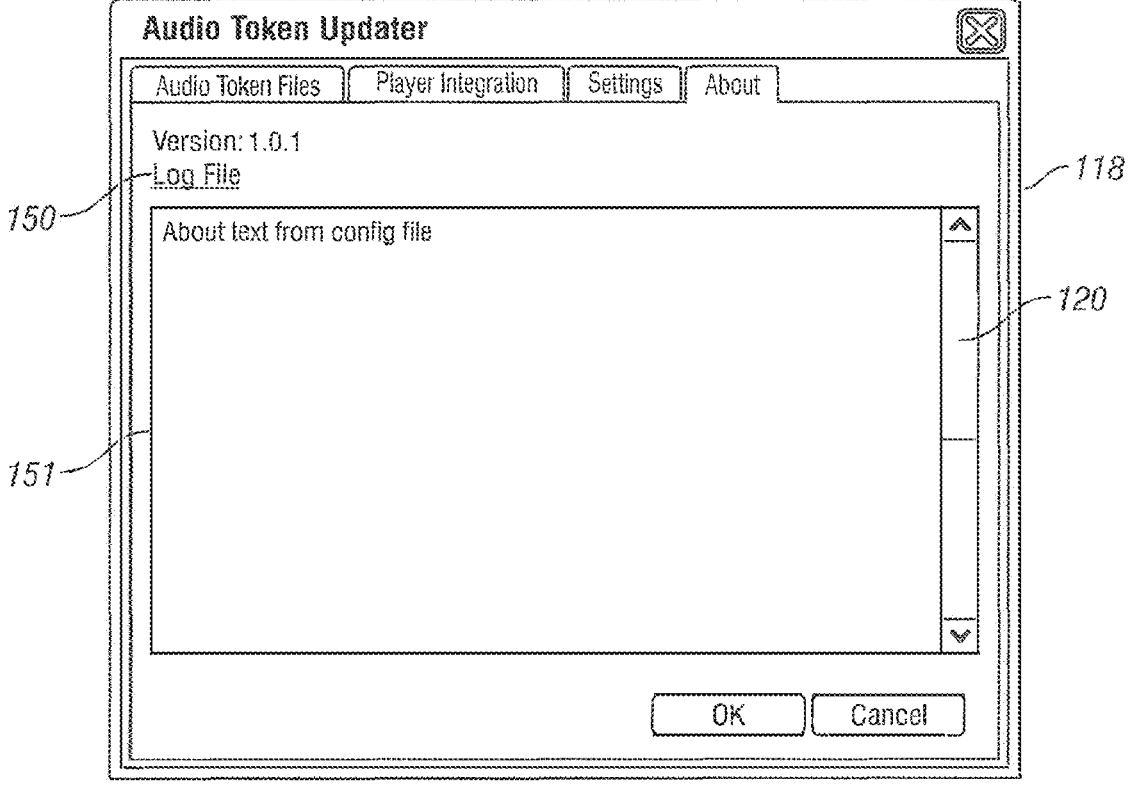
FIG. 7 illustrates an embodiment of a user interface that may be provided in connection with updater software showing the details of the updater software.

FIG. 5 also provides an About Audio Tokens link 116 that may be selected to open a window 118 (an example of which is illustrated in FIG. 7) having a text box 151 with a vertical scroll bar 120 and text provided by a content publisher that may provide information regarding dynamic audio files. Also in FIG. 7, a link 150, when selected, may launch a .txt log file for viewing in the text box 151. Such a log file may reveal the activities of the updater software. In one embodiment, a window 118 (FIG. 7) may also be accessed by selecting the About tab 66 of the user interface 70 of FIG. 5.

Figure 8:
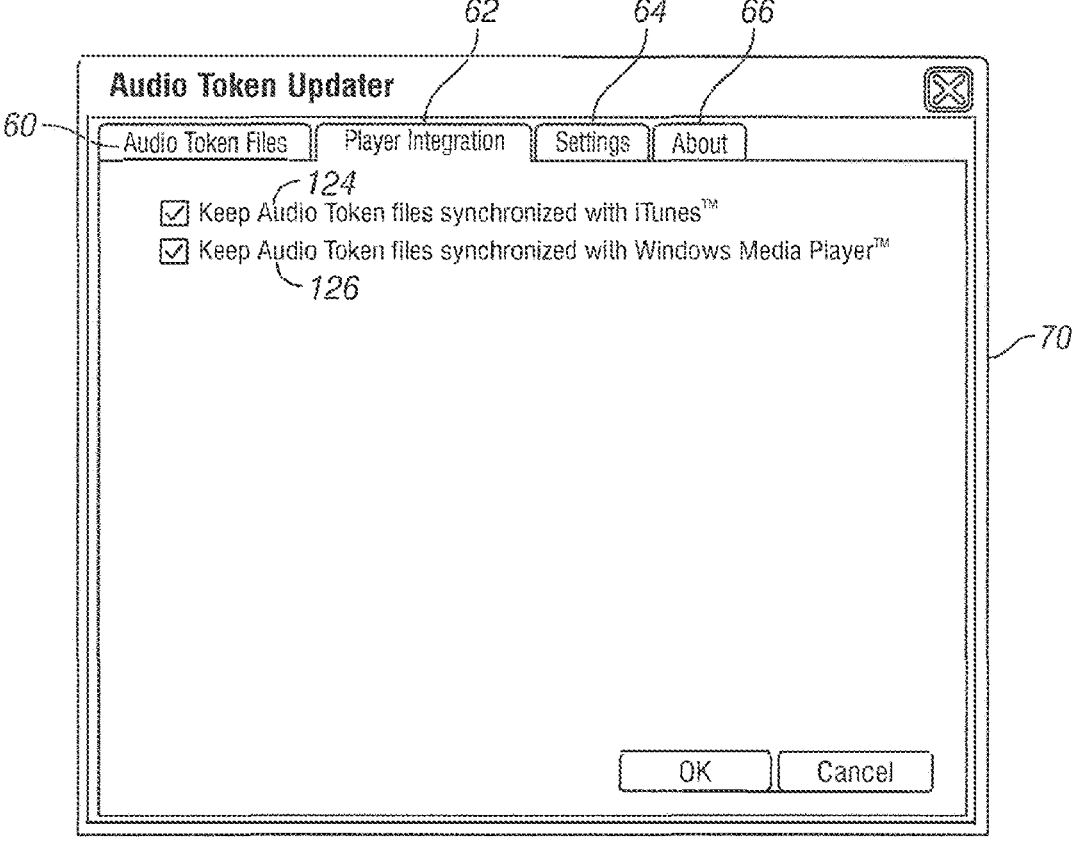
FIG. 8 illustrates an embodiment of a user interface that may be provided in connection with updater software showing options for media player integration.

If a user selects the Player Integration tab 62 of the user interface 70 illustrated in FIG. 5, the user interface 70 may display options for the user to govern how the updater software should interact with their media player(s), as shown in FIG. 8. In some embodiments, a user may have the option of having the updater software synchronize with specific media player(s), e.g., every time the updater software, or a media player, is launched, by checking a box next to either "Keep Audio Token files synchronized with iTunes" 124 or "Keep Audio Token files synchronized with Windows Media Player" 126. The updater software may provide only those options that correspond to media library management applications and media players detected on a user's computer. Those having skill in the art will appreciate that media players other than iTunes and Windows Media Player may be detected and referenced by the updater software. Also, in other embodiments a user may select media player applications for synchronization (not shown), rather than automatic detection by the updater software. Such integration may allow the updater software to update the media players with file attributes that have changed. For instance, the length of the dynamic audio file may change when the dynamic audio file is updated, e.g., as longer or shorter updated audio content is provided, and that updated length may be displayed in the media player's user interface. Those having skill in the art will appreciate that how a given media player reflects changes in the file attributes may depend on the richness of that media player's Application Programmer Interface (API).

Figure 9:
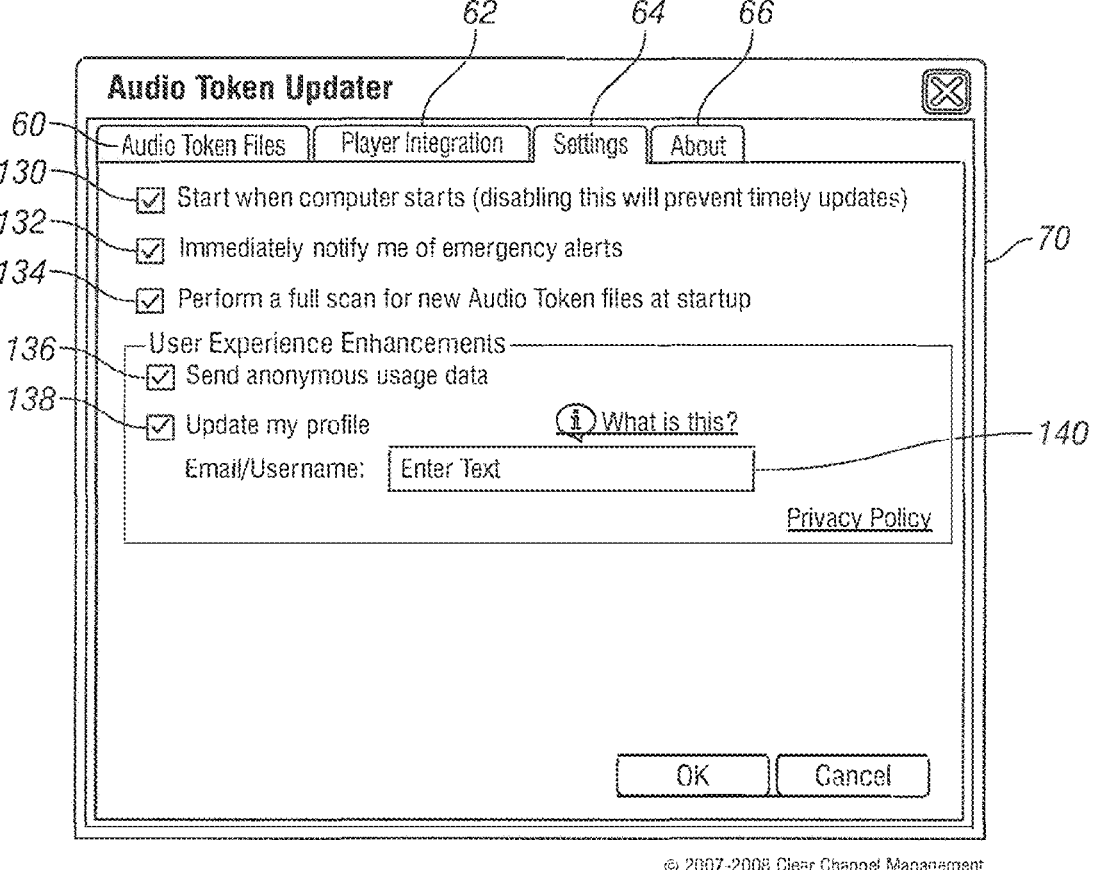
FIG. 9 illustrates an embodiment of a user interface that may be provided in connection with updater software showing settings that may be selected by a user.

FIG. 9 illustrates one embodiment wherein the user interface 70 may provide a Settings tab 64 that allows the user to further govern the behavior of the updater software. In some embodiments, the updater software may be set to start up automatically when the user's computer starts up. In this embodiment, the updater software defaults to an autostart mode, and a user may deselect checkbox 130 to disable that setting. In some embodiments, a dialog box may pop up asking the user to confirm that the user wants to disable the setting. In some embodiments, the updater software may immediately notify the user of emergency alerts by updating dynamic audio file with emergency alert content. A user may also elect to have the updater software immediately notify the user of emergency alerts, such as storm warnings, by selecting checkbox 132. The updater software may also periodically perform an automatic scan of the computer or a directory for new dynamic audio files. A user may enable the updater software to a scan for new dynamic audio files by selecting box 134. As noted above in connection with FIG. 5, of course, a user may also cause the updater software to scan for new dynamic audio files.

In some embodiments, the updater software may automatically, at various intervals, search for new dynamic audio files on a user's computer. If a new dynamic audio file is discovered that is not registered in the updater software, the new dynamic audio file may be added to an index of dynamic audio files in the updater software, including adding information regarding when the new dynamic audio file expires ("expire time") and thus when the dynamic audio file may be updated. The expire time may be adjusted to local time using the GMToffset attribute in an embodiment with attributes as described in Table 1. In order to prevent every single dynamic audio file from being updated at the same time, the expire time placed into the updater software's index may not be the literal expire time attribute (e.g., DateTimeExpires). Rather, {DateTimeExpires+Random(0-ExpiresResolution)seconds} may be used such that all dynamic audio files needing updates may be randomly distributed across a specified time window or time resolution (e.g. ExpiresResolution), e.g., a fifteen (15) minute time span, for updating rather than at the same time. Also, if the updater software has a setting that media players be updated with information regarding the new dynamic audio file, such information may be updated at that time.

Referring still to FIG. 9, the updater software may also send anonymous usage data comprising notification packets to a web service each time a dynamic audio file is updated. Or, a notification packet may be sent to the distributor of a dynamic audio file for tracking or marketing purposes. Such data may also be used to customize perishable content or advertising content. A user may stop the updater software from sending such anonymous usage data by unselecting checkbox 136. A user may add more information to notifications regarding usage data by entering a user name and profile in box 140 and selecting checkbox 138. For example, a radio broadcaster (e.g., Clear Channel) may maintain a web service for logging dynamic audio file updating at a central location. In various embodiments, such a web reporting service, or a server based interface, may accept notifications about the attributes of an updated file, for example but not limited to the following attributes: Old Unique Identifier, New Unique Identifier (may be the same value as Old Unique Identifier), Publisher, Title, ReplacementDate-Time, Email address (for example if "update my profile" 138 is selected in settings).

Figure 10:
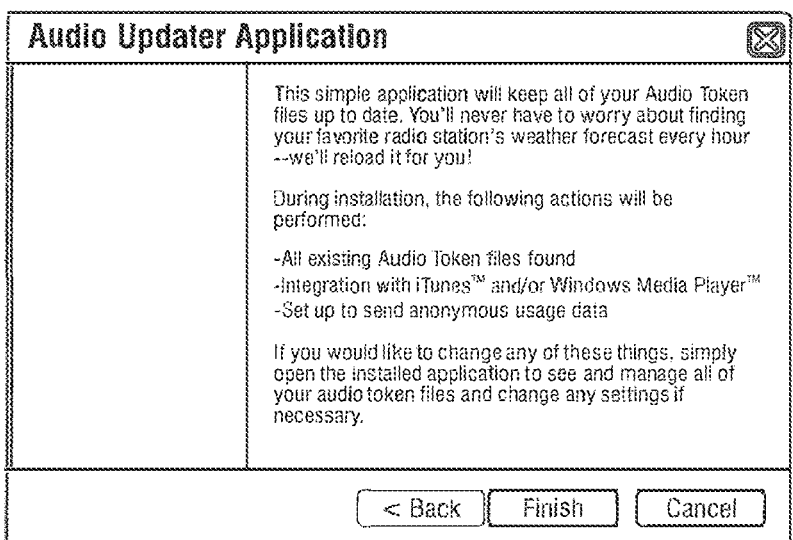
FIG. 10 illustrates an embodiment of a user interface that may be provided in connection with updater software showing information about dynamic audio files and updater software.

The installation for the updater software may be simple and user-friendly, with defaults being automatically set for optimal operation. The user may be given a notice stating that they can change these settings after the updater software is installed. A link to the updater installer may be placed into an ID3v2 predefined URL frame, e.g., official audio file webpage frame, since this is the URL most likely to be automatically or easily linked in a variety of browsers. A preamble comprising audio content in each dynamic audio file may also audibly refer to the location of the updater installer, so that if a user has downloaded the dynamic audio file and does not have the updater installer already, the user may be informed that additional functionality is available. FIG. 10 illustrates an embodiment of an updater installer user interface, showing information that may be provided to a user about the updater software, including basic information about updating the files and actions taken during installation of the software.

A dynamic audio file having the format described above may be updated according to the following exemplary process, e.g., when the computer system time matches the expire time (e.g., DateTimeExpires). If the ContentType is "EmergencyAlert" and there is no file present in the primary source link (e.g., SourceURL), the alternative source link (e.g., BackupSourceURL), or the redirection source link (e.g., AlertURL), the dynamic audio file may be deleted from the updater software's registry, the file system, and if the user has specified media player integration, the playlists of the user's media players.

If the ContentType is anything other than "EmergencyAlert", the redirection source link may still be checked for the presence of updated "EmergencyAlert" content. If updated "EmergencyAlert" content is present at the redirection source link, the updated "EmergencyAlert" content may be downloaded and given its own separate entry in the updater software's registry. If the user has specified that a notice be provided when updated "EmergencyAlert" content is downloaded from the redirection source link, a dialogue box may pop up notifying the user that "the following emergency alert was issued on <DateTimePublished>: <Title>". The <Title> area may be hot linked, and may launch the updated "EmergencyAlert" content in a default media player.

Regardless of whether or not updated "EmergencyAlert" content was present at the redirection source link, the updater software may next check the primary source link and the alternative source link for updated media content. If updated media content is found, then the updated media content may be downloaded and the preamble, if any, removed. The updated media content may then overwrite the previous media content in the dynamic audio file in the file system, provided there is not a file lock preventing overwriting. If there is a file lock on the file, for instance if the user is playing the dynamic audio file, the updater software may wait for the file lock to be released and then the dynamic audio file may be updated in the updater software's registry with the updated media content and a new expire time value. If the user has specified player integration, media players may be updated with the new duration of the audio content and any other attributes that are relevant and available through the media player APIs. If the user has specified that anonymous usage data be sent out (as described below), a notification may be sent having usage data to a web service location specified in a configuration file. If updated media content is not found, the updater software may keep trying based on a "New file not found retry interval" that may be provided in the configuration file as noted below.

Furthermore, in some embodiments, upon installing a dynamic audio file on the user's computer, an XML configuration file may be placed in the installation directory with the following values: About Dynamic Audio Files text, About Updater Software text, Privacy Policy URL, Anonymous Reporting Web Service URL, User Profile Page URL, New file not found retry interval (in minutes), SendtoFriendSubject, and SendtoFriendText.

A dynamic audio file may be created either manually or automatically by use of assembly software. For example, a radio broadcaster may utilize XML assembly software on its computer systems before distributing audio content, such that distributed audio content is incorporated into dynamic audio files. Table 3 discloses exemplary attributes that may be contained in an assembly XML file that may be used to create a dynamic audio file. In some embodiments, an assembly XML file may contain all of the attributes listed in Table 3 for the header portion of the dynamic audio file. An assembly XML file may also contain information about where to find the audio content and where to save and how to name the output file. In Table 3, an "n/a" in the "Destination" column indicates that the attribute may not be relevant to Table 3 in some embodiments.

In other embodiments, a command line executable may be used to create a properly formatted dynamic audio file. A command line executable may take a single input file path, for example, either the full path to a specific assembly XML file or a directory path containing multiple assembly XML files. If the input file path is a directory path to a directory containing multiple assembly XML files, the assembly software may look at every XML file in that directory and attempt to parse each XML file as if it were an assembly XML file. If the assembly software does not recognize the XML file as an assembly XML file, the assembly software may output the failure and the reason there for to an error log. The assembly software may then move on to the next XML file and proceed to either create a dynamic audio file or output a failure and reason therefor to an error log. The assembly software may work through each XML file in the foregoing manner until all XML files have been reviewed in the directory path.

In still other embodiments, the assembly software may provide a user interface to assist a broadcaster in creation of a dynamic audio file. An exemplary user interface of the assembly software may have a "Create a New Dynamic Audio File" function with a form providing a windows control appropriate to one or more of the exemplary attributes specified in Table 4. A user interface provided by the assembly software may also have a directory file browse function so that a user may visually select the input for the command line executable file. A "Create File" button may be selected which would launch an executable file having the selected input. In some embodiments, the assembly software may comprise a configuration file which may provide default values for certain attributes that appear in the user interface. This configuration file may also provide attribute values for attributes that may not be changed or selected through the user interface of the assembly software. Table 4 provides data used for an embodiment of the assembly software to create a dynamic audio file. Table 4 provides both the user interface elements of the assembly software and the items that may appear in some embodiments of an assembly XML, file. Table 4 also contains information about how some of the data elements may behave in the operation of some embodiments of the assembly software.

Figure 11:
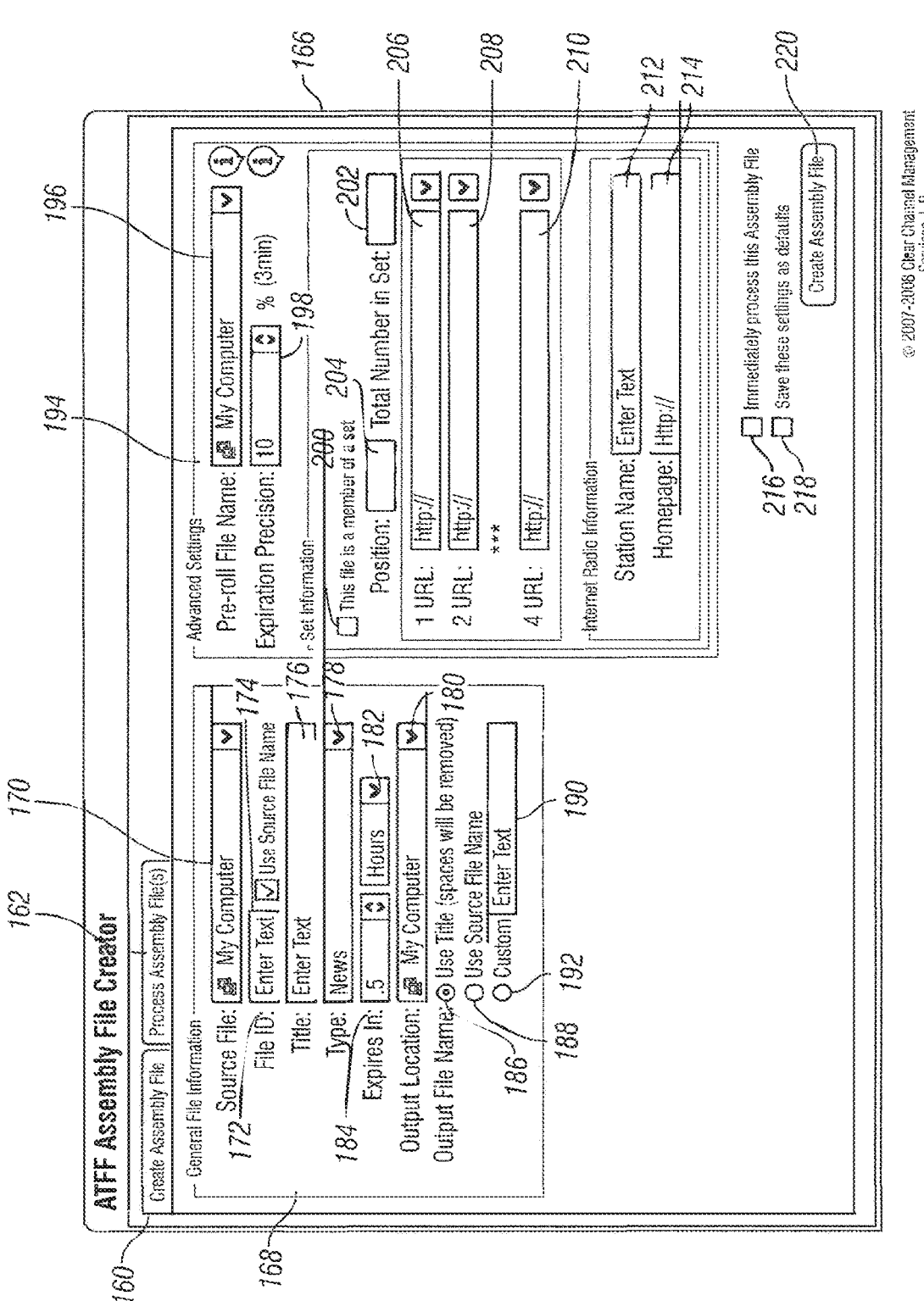
FIG. 11 illustrates an embodiment of a user interface that may be provided in connection with assembly software.

FIG. 11 illustrates one embodiment of a user interface 166 provided in connection with assembly software to assist a content publisher or other user in creating a dynamic audio file. A number of options may appear within the "ATFF Assembly File Creator" user interface 166. In this embodiment, ATFF refers to Audio Token File Format, i.e., a dynamic audio file.

The interface 166 may include a Create Assembly File tab 160 that provides a number of sections that a user may access to set dynamic audio file variables and preferences. A General File Information section 168 may provide a content file path menu 170 for a user to input a source file for the audio content that may be used in the dynamic audio file being created, and a Browse button (not shown) that allows a user to browse their computer's local drives (or remote sources) for the audio content. A file identification number may be entered in a field 172 or a checkbox 174 may be selected to use the source file name as the identification number. A user may enter a title for the file in field 176 and may select the type of content by use of drop-down menu 178. The expiration time, or length of time after which the content will be deemed stale, may be set by using drop down menus 182 and 184. An Output Directory may be selected via menu 180 or selected using a Browse button (not shown). The output file name may be the Title entered into field 176 by selecting the Use Title option button 186. Alternatively, the source file name may be selected as the output file name by selecting button 188. In yet another alternative embodiment, a user may enter a custom output file name in field 190 by selecting button 192.

An Advanced Settings section 194 may allow a user to select a preamble file location by using drop down menu 196 and selecting the location on the user's computer from which the assembly software may retrieve the preamble. A user may specify how many minutes the expiration time may be delayed by selecting a precision value from drop down menu 198. The precision value may allow the updater software or content server to advance or delay updating slightly to avoid content server overload.

A Set Information section may allow a user to identify a file as being a member of a set of files by selecting checkbox 200. The number of dynamic audio files in the set may be selected through menu 202 and the location in the set may be altered by a Position menu 204. In some embodiments, the dynamic audio file's position in the set may be selected by using menu 204. A dynamic audio file may also be added to the set by entering the dynamic audio files fields 206, 208 and 210. Alternatively, the primary source link may be entered into field 206 and the alternative source links may be entered into fields 208 and 210. In other embodiments, those fields may be used, or other fields may be provided for fail-over and redirection source links. A source, such as a radio station, that distributes the dynamic audio file may be entered into a field 212 with the source's homepage being entered into another field 214. In various embodiments, the source may be an Internet radio station. A user may indicate that the dynamic audio file should be immediately processed by selecting checkbox 216. A user may save the settings as defaults for creation of other dynamic audio files by selecting checkbox 218. To create the dynamic audio file having the specified attributes, a user may select the Create Assembly File button 220.

In other embodiments, a user may click a Reset button (not shown) to clear the settings entered into interface 166. Under the Process Assembly File(s) tab 162, a user may select one or more dynamic audio files to process.

Dynamic audio files and the methods of use described herein may provide a radio broadcaster an efficient and flexible method of distributing audio content. Such dynamic audio files may serve as a "placeholder" audio file in a media library or playlist, where the content of the dynamic audio file may be updated or refreshed. Thus, "News" or "Sports" dynamic audio files, for example, allow a listener access to fresh news or sports content without having to reconstruct a playlist. Various embodiments described herein allow a user to specify how content should be distributed to them. Some embodiments are user friendly, as a user need not affirmatively request updates. Thus, such embodiments may promote and increase user interest in the content source.

Of course other embodiments may include a system and method that may be practiced by a non-broadcaster or other content provider. For example, a school district may distribute news to parents, students and teachers through the use of dynamic audio files. Or, multi-level distribution companies may use dynamic audio files to distribute content to various audiences. For example, depending on a user's profile, an audio token may be updated with different content for different users. Content may be updated to different groups of people.

Although various exemplary embodiments have been shown and described, the invention is not limited to the embodiments shown and described. Therefore, the scope of the invention is intended to be limited solely by the scope of the claims that follow.

What is claimed is:

1. A method for execution by one or more processing modules of one or more computing devices of a server computer, the method comprising:
obtaining first user input specifying a first file location associated with pre-roll content, and second user input specifying a second file location associated with time-sensitive content;
generating, by the server computer, a dynamic data file, wherein generating the dynamic data file includes
inserting a first link to the first file location into the dynamic data file;
inserting a second link to the second file location into the dynamic data file;
inserting an expiration time into the dynamic data file, wherein the expiration time indicates a length of time after which content of the dynamic data file will be deemed stale;
inserting an expiration resolution into the dynamic data file;
transmitting the dynamic data file to a computing device, wherein a media player being executed on the computing device retrieves the pre-roll content from the first file location and plays out the pre-roll content, and obtains the time-sensitive content from the second file location and plays out the time-sensitive content; and
controlling updater software being executed on the computing device to shift an update time of the dynamic data file based on the expiration resolution.

2. The method of claim 1, wherein generating the dynamic data file includes:
inserting a backup file location associated with the time-sensitive content into the dynamic data file.
3. The method of claim 1, further comprising:
receiving, by the server computer via a communications interface, user profile information indicating a geographic area; and
wherein the second link is selected based, at least in part, on the geographic area.
4. A method for execution by one or more processing modules of one or more computing devices of a server computer, the method comprising:
obtaining first user input specifying a first file location associated with a first source of media content, and a second user input specifying a second file location associated with a backup source of the media content;
generating, by the server computer, a dynamic media file, wherein generating the dynamic media file includes
inserting a content-source link to the first file location into the dynamic media file;
inserting a backup-source link to the second file location into the dynamic media file;
inserting an expiration time into the dynamic media file, wherein the expiration time indicates a length of time after which content of the dynamic media file will be deemed stale;
inserting an expiration resolution into the dynamic media;
transmitting the dynamic media file to a computing device, wherein a media player being executed on the computing device attempts to retrieve the media content from the first file location, and in response to being unable to retrieve the media content from the first file location, attempts to retrieve the media content from the second file location; and
controlling updater software being executed on the computing device to shift an update time of the dynamic media file based on the expiration resolution.
5. The method of claim 4, wherein:
the first file location and the second file location are associated with targeted advertising content.
6. The method of claim 5, further comprising:
receiving, by the server computer via a communications interface, user profile information; and
selecting the targeted advertising content from a set of targeted advertising files generated based on the user profile information.
7. The method of claim 6, wherein:
the user profile information specifies a geographic area; and
generating said dynamic media file includes selecting at least the content-source link based, at least in part, on the geographic area.
8. The method of claim 4, further comprising:
setting a PreRoll attribute identifying a location of media content to be presented to a user prior to presenting other content included in the dynamic media file.
9. The method of claim 4, further comprising:
obtaining third user input specifying a third file location associated with pre-roll content; and
inserting a third link to the third file location into the dynamic media file.
10. The method of claim 4, wherein said dynamic media file is further associated with:
a redirection source link associated with content different from the media content.

11. The method of claim 4, further comprising:

receiving usage data including a notification packet indicating that the dynamic media file has been updated.

12. A server computer comprising:

an interface configured to interface and communicate with a communication system;

memory that stores operational instructions; and processing circuitry operably coupled to the interface and to the memory, wherein the processing circuitry is configured to execute the operational instructions to:

receive user profile information;

obtain first user input specifying a first file location associated with pre-roll content, and second user input specifying a second file location associated with time-sensitive content;

generate a dynamic media file based at least in part on the user profile information, wherein generating the dynamic media file includes inserting a first link to the first file location into the dynamic media file;

inserting a second link to the second file location into the dynamic media file;

inserting an expiration time into the dynamic media file, wherein the expiration time indicates a length of time after which content of the dynamic media file will be deemed stale;

inserting an expiration resolution into the dynamic media file;

generate a playlist;

insert the dynamic media file in the playlist;

transmit the playlist to a computing device, wherein a media player being executed on the computing device retrieves the pre-roll content from the first file location and plays out the pre-roll content, and obtains the time-sensitive content from the second file location and plays out the time-sensitive content; and control updater software being executed on the computing device to shift an update time of the dynamic media file based on the expiration resolution.

13. The server computer of claim 12, wherein:

the second file location is associated with targeted advertising content.

14. The server computer of claim 12, wherein the processing circuitry is further configured to execute the operational instructions to:

insert a redirection source link associated with content different from the media content into the dynamic media file.

15. The server computer of claim 12, wherein the processing circuitry is further configured to execute the operational instructions to:

set a PreRoll attribute identifying a location of media content to be presented to a user prior to presenting other content included in the dynamic media file.

16. The server computer of claim 12, wherein the processing circuitry is further configured to execute the operational instructions to:

obtain third user input specifying a backup file location associated with an alternate location of the time-sensitive content; and inserting a third link to the backup file location into the dynamic media file.

17. The server computer of claim 12, wherein:

the user profile information specifies a geographic area; and the dynamic media file is selected based, at least in part, on the geographic area.

18. The server computer of claim 12, wherein the processing circuitry is further configured to execute the operational instructions to:

receive usage data including a notification packet indicating that the dynamic media file has been updated.

* * * * *